United States Patent
Girdhar et al.

(10) Patent No.: US 10,455,391 B2
(45) Date of Patent: Oct. 22, 2019

(54) COMMUNICATION POLICY CONTROL IN A MACHINE-TO-MACHINE COMMUNICATION SYSTEM

(71) Applicant: Telefonaktiebolaget LM Ericsson (publ), Stockholm (SE)

(72) Inventors: Kirti Girdhar, Gurgaon (IN); Sandeep Akhouri, New Delhi (IN); Sumit Singhal, Karlskrona (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/737,051

(22) PCT Filed: Jun. 29, 2015

(86) PCT No.: PCT/IN2015/050055
§ 371 (c)(1),
(2) Date: Dec. 15, 2017

(87) PCT Pub. No.: WO2017/002129
PCT Pub. Date: Jan. 5, 2017

(65) Prior Publication Data
US 2018/0176754 A1   Jun. 21, 2018

(51) Int. Cl.
*H04W 88/06* (2009.01)
*H04W 4/70* (2018.01)
(Continued)

(52) U.S. Cl.
CPC ............. *H04W 4/70* (2018.02); *H04L 47/20* (2013.01); *H04W 8/18* (2013.01); *H04W 76/27* (2018.02);
(Continued)

(58) Field of Classification Search
CPC ......... H04W 4/70; H04W 76/27; H04W 8/18; H04W 88/06; H04L 47/20; H04L 67/42; H04L 47/2425
See application file for complete search history.

(56) References Cited

U.S. PATENT DOCUMENTS 7,640,299 B2   12/2009   Kaler et al.
2006/0117025 A1*  6/2006   Kaler .................. H04L 67/104
(Continued)

FOREIGN PATENT DOCUMENTS

EP   2663155 A1   11/2013
EP   2916616 A2   9/2015
(Continued)

OTHER PUBLICATIONS

DLMS User Association; "COSEM Interface Objects," Companion Specification for Energy Metering; Jan. 1, 1999, XP002780046, pp. 1-51. Excerpt from DLMS UA 1000-1:1999, Second Edition. Available at: http://dlms.com/documents/archive/Excerpt%20BB2.PDF.
(Continued)

*Primary Examiner* — Lakeram Jangbahadur
(74) *Attorney, Agent, or Firm* — Coats & Bennett, PLLC (57) ABSTRACT

The invention is directed towards a communication policy control device (22), method, computer program and computer program product for determining type of communication to be used by a client entity reporting data to a server entity in a machine-to-machine communication system, where the client entity and server entity have at least two different available communication types between each other. The communication policy control device 22 monitors the connection state of communication according to a current communication type over a current communication medium, identifies system parameters affected by the connection state, selects a communication policy (P1, P2, P3) based on the affected system parameters, said communication policy
(Continued)

setting out rules for the use of one or more communication types, and activates communication over a communication medium according to a communication type specified by the selected communication policy, if not already in place.

17 Claims, 9 Drawing Sheets

(51) Int. Cl.
| | | |
|---|---|---|
| *H04L 12/813* | (2013.01) | |
| *H04W 8/18* | (2009.01) | |
| *H04W 76/27* | (2018.01) | |
| *H04L 12/851* | (2013.01) | |
| *H04L 29/06* | (2006.01) | |

(52) U.S. Cl.
CPC ......... *H04W 88/06* (2013.01); *H04L 47/2425* (2013.01); *H04L 67/42* (2013.01)

(56) References Cited

U.S. PATENT DOCUMENTS

| | | |
|---|---|---|
| 2013/0148500 A1 | 6/2013 | Sonoda et al. |
| 2015/0256962 A1* | 9/2015 | Yang .................... H04W 88/16 370/329 |
| 2016/0210578 A1* | 7/2016 | Raleigh ............ G06Q 10/06375 |

FOREIGN PATENT DOCUMENTS

| | | | | |
|---|---|---|---|---|
| JP | 2009522690 A | | 6/2009 | |
| JP | 2015005849 A | * | 1/2015 | ........... H04L 12/813 |
| JP | 2015005849 A | | 1/2015 | |

OTHER PUBLICATIONS

DLMS User Association; "DLMS/XOSEM Architecture and Protocols;" Excerpt from Companion Specification for Energy Metering; Jul. 7, 2014; pp. 1-101; DLMS UA 1000-2 Ed. 8; Excerpt DLMS User Association.

DLMS User Association; "DLMS/COSEM Conformance Testing Process;" Technical Report: Companion Specification for Energy Metering; Jun. 19, 2015; pp. 1-44; Excerpt from DLMS UA 1001-1 Ed. 5.0 V 1.0; DLMS DLMS User Association.

DLMS User Association; COSEM Glossary of Terms; Technical Report: Companion Specification for Energy Metering; 2003; pp. 1-25; DLMS UA 1002:2003, Ed. 1; DLMS User Association.

DLMS User Association; "COSEM interface classes and OBIS identification system;" Excerpt from Companion Specification for Energy Metering; Sep. 12, 2014; pp. 1-221; Excerpt DLMS UA 1000-1 Ed. 12.0; DLMS User Association.

LightweightM2M; "OMA LightweightM2M V1.0 Overview;" Retrieved from the Internet: URL:http://www.openmobilealliance.org/wp/overviews/lightweightm2m_overview.html [retrieved on Dec. 12, 2017]; Open Mobile Alliance; Oct. 2017; pp. 1-2.

Fujitsu Laboratories Ltd., "Fujitsu Laboratories Develops World's First Automatic Protocol Selection Technology for Any Environment; Automatically selects protocol best-suited for particular communications environment to ensure smooth operation, even from remote sites", Mar. 7, 2013, pp. 1-4, retrieved from Internet https://www.fujitsu.com/global/about/resources/news/press-releases/2013/0307-01.html.

* cited by examiner

COMMUNICATION POLICY CONTROL IN A MACHINE-TO-MACHINE COMMUNICATION SYSTEM

TECHNICAL FIELD

The invention relates to machine-to-machine communication. More particularly the invention relates to a communication policy control device, method, computer program and computer program product for determining type of communication to be used by a client entity reporting data to a server entity.

BACKGROUND

Machine to Machine (M2M) and Internet of Things (IoT) covers a huge set of devices that communicate with each other and with networks based on various communication or access media, both as short range technologies and long range technologies.

Lightweight (LW) M2M is a new standard from the Open Mobile Alliance (OMA) that is focused on constrained cellular and other M2M devices. The standard defines an efficient device-server interface based on open Internet Engineering Task Force (IETF) standards i.e. Constrained Application Protocol (CoAP) and Datagram Transport Layer Security (DTLS). An LWM2M enabler includes device management and service enablement for LWM2M Devices. This enabler makes use of a light and compact protocol as well as an efficient resource data model.

IEC 62056 is a set of standards for Electricity metering data exchange by International Electrotechnical Commission. The IEC 62056 standards are the International Standard versions of the so-called DLMS/COSEM specification. Device Language Message Specification (DLMS) is the suite of standards developed and maintained by the DLMS User Association.

COSEM or Companion Specification for Energy Metering includes a set of specifications that defines the Transport and Application Layers of the DLMS protocol. The DLMS User Association defines the protocols into a set of four specification documents namely Green Book, Yellow Book, Blue Book and White Book. The Blue book describes a COSEM meter object model and an object identification system (OBIS), the Green book describes the Architecture and Protocols, the Yellow book treats all the questions concerning conformance testing, while the White book contains the glossary of terms.

Some of the key points pertaining to machine to machine communication involve:

M2M ecosystem consists of a variety of devices ranging from home automation, transportation, healthcare etc. These devices include fixed and mobile devices that can communicate over short or long range technologies.

The traffic or payload generated by M2M devices consists of messages with small size but numerous in nature. Also, the number of such devices (projected 50 Billion by 2020) require that the network usage shall be optimum in nature to efficiently and effectively use network resources.

LWM2M enabler has evolved as a standard specification that captures a set of interfaces and an efficient payload based on a simple flat client server architecture.

Typically communication is provided as a client-server type of communication, where a device having data to report, acts as a client entity and the device that receives the data acts as a server entity. Communication may here typically take place according to the OSI model, so that a client entity is a client access point communicating with a server access point via a communication medium using the OSI model.

The communication types supported by COSEM client/server are:
3-Layer, Connection Oriented (CO), HDLC based profile communication type
TCP-UDP/IP based communication type
S-FSK PLC based communication type The 3-Layer, CO, HDLC based communication type is suitable for local data exchange with metering equipment via direct connection, or remote data exchange via the PSTN or GSM networks.

The TCP-UDP/IP based communication type is suitable for remote data exchange with metering equipment via IP enabled networks (for example Internet), using various communication networks, such as Local Area Networks or public or private Wide Area Networks.

The S-FSK PLC communication type is intended for remote data exchange over the low voltage electricity supply network between data concentrators located in MV/LV substations and meters connected to the LV network.

All the above mentioned communication types may also need communication type settings such as IP addresses and port numbers. The combination of communication type and setting may be termed a communication profile.

As can be seen above, there is support for one or more communication profiles. However, the mechanism for selection of which communication profile to apply is administrative in nature and there is no support to dynamically decide on which communication profile to activate and any rules for how to determine communication profile.

It is in view of what has been stated above a need for ways of selecting communication type to use in order to allow the implementation of more efficient M2M use.

SUMMARY

The invention is therefore directed towards providing a more efficient machine-to-machine system usage.

This object is according to a first aspect achieved by a communication policy control device for determining type of communication to be used by a client entity reporting data to a server entity in a machine-to-machine communication system. The client entity and server entity have at least two different available communication types between each other. Furthermore, the communication policy control device comprises a processor acting on computer instructions whereby the communication policy control device is configured to:
monitor the connection state of communication according to a current communication type over a current communication medium,
identify system parameters affected by the connection state,
select a communication policy based on the affected system parameters, and
activate communication over a communication medium according to a communication type specified by the selected communication policy, if not already in place.

The selected communication policy furthermore sets out rules for the use of one or more communication types.

The object is according to a second aspect achieved through a method of determining type of communication to be used by a client entity reporting data to a server entity in a machine-to-machine communication system. The client entity and server entity have at least two different available communication types between each other. The method is performed by a communication policy control device and comprises:

monitoring the connection state of communication according to a current communication type over a current communication medium, identifying system parameters affected by the connection state, selecting a communication policy based on the affected system parameters, and activating communication over a communication medium according to a communication type specified by the selected communication policy, if not already in place.

The selected communication policy furthermore sets out rules for the use of one or more communication types.

The object is according to a third aspect achieved through a computer program for determining type of communication to be used by a client entity reporting data to a server entity in a machine-to-machine communication system. The client entity and server entity have at least two different available communication types between each other. The computer program comprises computer program code which when run by a processor forms a communication policy control unit of a communication policy control device causes the communication policy control unit to be operative to:

monitor the connection state of communication according to a current communication type over a current communication medium, identify system parameters affected by the connection state, select a communication policy based on the affected system parameters, and activate communication over a communication medium according to a communication type specified by the selected communication policy, if not already in place.

The selected communication policy furthermore sets out rules for the use of one or more communication types.

The object is according to a fourth aspect achieved through a computer program product for determining type of communication to be used by a client entity reporting data to a server entity. The computer program product comprises a data carrier with computer program code according to the third aspect.

According to a first variation of the various aspects, the client entity may control the transmission of data from one or more applications to the server entity and the system parameters may comprise client entity parameters, application parameters and communication parameters of the currently used communication medium and communication type.

In a second variation of the first aspect, the communication policy control device, when selecting a communication policy, is operative to select policy also based on the character of an application for which at least some application parameters have been found to be affected.

In a corresponding variation of the second aspect the selecting of a communication policy is also based on the character of an application for which at least some application parameters have been found to be affected.

In a third variation of the first aspect, the communication policy control device, when activating communication over a communication medium according to a communication type, is operative to implement settings for communication over the selected medium according to the communication type.

In a corresponding variation of the second aspect, the activating of communication over a communication medium according to a communication type comprises implementing settings for communication over the selected medium according to the communication type.

In a fourth variation of the first aspect, the communication policy control device is operative to identify applications having data to send when identifying system parameters affected by the connection state.

In a corresponding variation of the second aspect, the identifying of system parameters affected by the connection state comprises identifying applications having data to send.

In a fifth variation of the first aspect, the communication policy control device is operative to update one or more of the communication policies in real-time.

In a corresponding variation of the second aspect, the method further comprises updating one or more of the communication policies in real-time.

The communication policy control device may be implemented in the server entity. Alternatively it may be implemented in the client entity.

In a sixth variation of the first aspect where it is implemented in the client entity, the communication policy control device, when updating one or more of the communication policies, is operative to perform the update based on an instruction from the server entity.

In a corresponding variation of the second aspect, the updating is performed based on an instruction from the server entity.

The invention has a number of advantages. It allows a dynamic selection of communication type and communication medium based on communication state and system parameters affected by the communication state. Thereby it is possible to more efficiently use the communication types and communication media at hand for the M2M system. This can be used to allow dynamic control over the communication types and communication media. This can also be useful in load-sharing and active-standby kind of cases where there may exist a need to ensure that the M2M Device is intelligently handling traffic flow It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail.

The present invention concerns machine-to-machine (M2M) communication and more particularly Lightweight (LW) M2M.

LWM2M is a new standard from the Open Mobile Alliance (OMA) that is focused on constrained cellular and other M2M devices. The standard defines an efficient device-server interface based on open Internet Engineering Task Force (IETF) standards i.e. Constrained Application Protocol (CoAP) and Datagram Transport Layer Security (DTLS). An LWM2M enabler includes device management and service enablement for LWM2M Devices. This enabler makes use of a light and compact protocol as well as an efficient resource data model.

IEC 62056 is a set of standards for Electricity metering data exchange by International Electrotechnical Commission. The IEC 62056 standards are the International Standard versions of the DLMS/COSEM specification.

Device Language Message Specification (DLMS) is a suite of standards developed and maintained by the DLMS User Association.

COSEM or Companion Specification for Energy Metering includes a set of specifications that defines the Transport and Application Layers of the DLMS protocol. The DLMS User Association defines the protocols into a set of four specification documents namely Green Book, Yellow Book, Blue Book and White Book. The Blue book describes a COSEM meter object model and an object identification system (OBIS), the Green book describes the Architecture and Protocols, the Yellow book treats all the questions concerning conformance testing, while the White book contains the glossary of terms Some of the key points pertaining to machine to machine communication involve:

An M2M ecosystem comprises of a variety of devices ranging from home automation, transportation, healthcare etc. These devices include fixed and mobile devices that can communicate with network over short or long range technologies.

The traffic or payload generated by M2M devices consists of messages with small size but numerous in nature. Also, the number of such devices (projected 50 Billion by 2020) require that the network usage shall be optimum in nature to efficiently and effectively use network resources.

LWM2M enabler has evolved as a standard specification that captures a set of interfaces and an efficient payload based on a simple flat client server architecture that is based on the OSI layer model.

The COSEM client/server organisation supports a number of communication types:
a first communication type CT1, which is a 3-Layer, Connection Oriented (CO), High-level Data Link Control (HDLC) based communication type
a second communication type CT2, which is a Transmission Control Protocol (TCP)-User Datagram Protocol (UDP)/Internet Protocol (IP) based communication type, and
a third communication type CT3, which is a Spread-Frequency Shift Keying (S-FSK) Power Line Communication (PLC) based communication type The 3-Layer, CO, HDLC based communication type is suitable for local data exchange with metering equipment via direct connection, or remote data exchange via PSTN or GSM networks.

The TCP-UDP/IP based communication type is suitable for remote data exchange with metering equipment via IP enabled networks (for example Internet), using various communication networks, such as Local Area Networks (LAN) or public or private Wide Area Networks such as the Internet or a third Generation (3G) mobile communication network like Universal Mobile Telecommunications System (UMTS) or a fourth generation (4G) network such as Long-Term Evolution (LTE).

The S-FSK PLC communication type is intended for remote data exchange over the low voltage electricity supply network between data concentrators located in Medium Voltage/Low Voltage MV/LV substations and meters connected to the LV network.

The communication types mentioned above may need some settings in order to be used, such as addresses and port numbers. The combination of communication type and settings is often referred to as communication profile.

COSEM provides support of one or more communication profiles. However, the mechanism for selection of which communication profile to apply is administrative in nature and there is no support to dynamically decide on which communication profile to activate based on a communication policy is not supported.

Aspects of the invention are directed towards improving on this situation. Aspects of the invention are more particularly directed towards providing a communication policy control device as well as a method, computer program and computer program product for determining type of communication.

Figure 1:
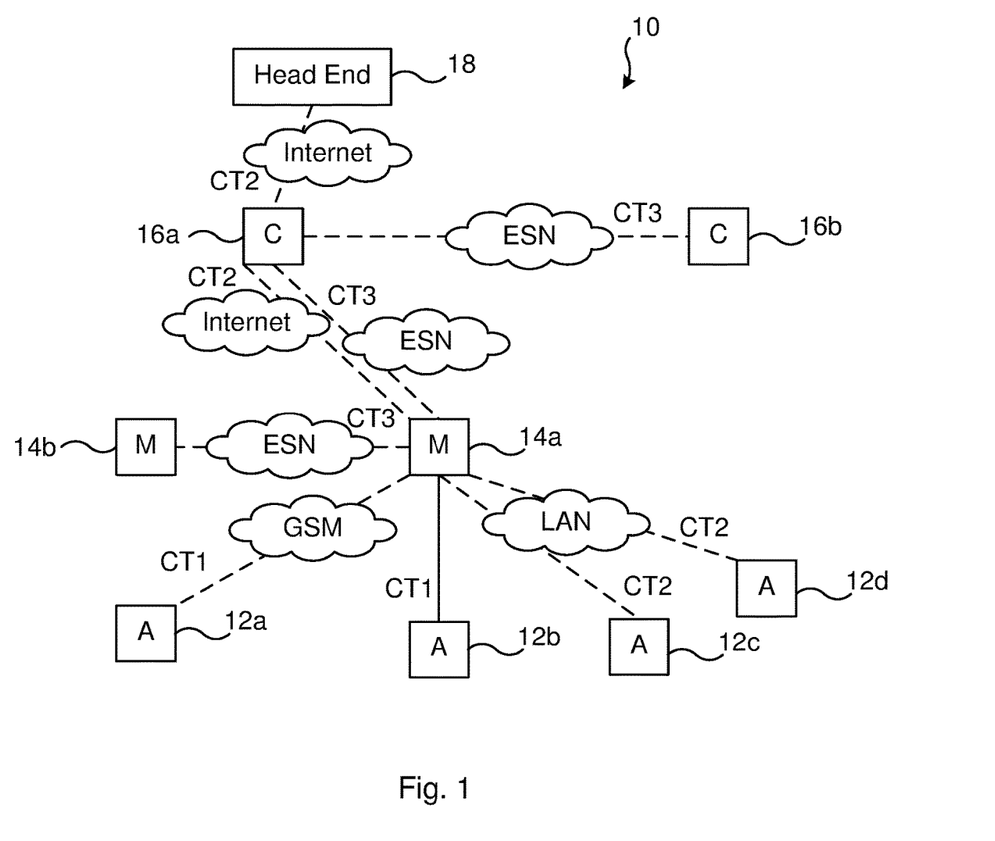
FIG. 1 schematically shows a possible machine-to-machine communication scenario where a number of different communication types exist, FIG. 2 schematically shows an M2M-communication system in which a number of different communication types are used, FIG. 3 schematically shows the client server structure of Lightweight M2M, where an M2M device that hosts a client entity also acts as a communication policy control device.

FIG. 1 schematically shows an exemplifying machine-to-machine (M2) communication environment 10 in which one or more M2M communication systems may be provided. In the environment there is a first data reporting M2M device 12A, a second data reporting M2M device 12B, a third data reporting M2M device 12C and a fourth data reporting M2M device 12D. A data reporting M2M device may here be an M2M device that comprises an application A that sends data intended for a server entity that controls various devices of an M2M system. A data reporting M2M device may be such things as a utility meter, such as an electricity meter. However, it may also be such things as a video camera, a thermometer or a refrigerator. The appliances 12A, 12B, 12C and 12D are here all connected to a first smart utility meter M 14A, which utility meter also acts as a data concentrator with regard to the first, second, third and fourth data reporting M2M device 12A, 12B, 12C and 12D. Also the utility meter 14A is an M2M device reporting data. It can here be seen that that the first data reporting M2M device 12A communicates with the first utility meter 14A over a communication medium in the form of second generation mobile communication system, which is here Global System for Mobile Communication (GSM). It is further using the first communication type CT1 over this communication medium. The second data reporting M2M device 12B has a point-to-point connection as a communication medium to the first utility meter 14A and also uses the first communication type CT1. Both the first and the second data reporting M2M devices 12A and 12B thus use HDLC. The third data reporting M2M device 12C is on the other hand connected to the first utility meter 14A via a local area network (LAN) as a communication medium and uses the second communication type CT2. The fourth data reporting M2M device 12D is connected to the first utility meter 14A via the same LAN and also uses the second communication type CT2. The third and fourth data reporting M2M devices 12C and 12D thus both use TCP/IP or UDP/IP. The first utility meter 14A is also connected to a second smart utility meter M 14B and this connection is obtained via an electric power supply network ESN as communication medium and using the third communication type CT3. In this communication it thus uses S-FSK PLC. Thereby the first utility meter 14A may likewise act as a concentrator with regard to the second utility meter 14B, which second utility meter 14B is also a data reporting M2M device.

The first utility meter 14A also has two connections with a first concentrator 16A, where a first connection uses the second communication type CT2 and the Internet as communication medium, while a second connection uses the third communication type CT3 and ESN as communication medium. The first concentrator 16A is in turn connected to a second concentrator 16B via an ESN network and using the third communication type CT3, as well as to a head end 18, via the Internet and the second communication type CT2.

As mentioned earlier the environment may provide one or more M2M systems controlled by a system server. The head end 18 may implement one or more such servers. In such a system the first utility meter 14A may furthermore form a client entity communicating with a server entity of the system via the first concentrator 16A, where the server entity may be provided by the head-end 18.

Figure 2:
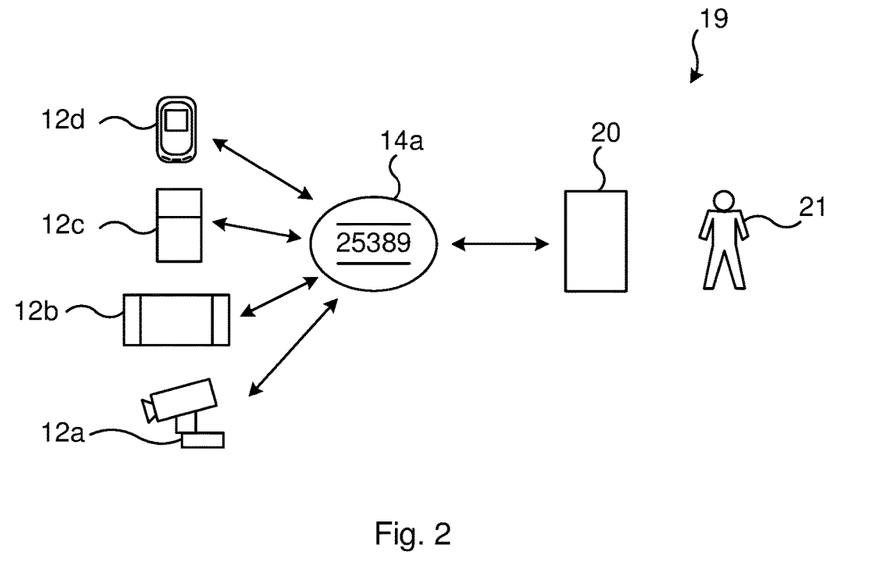

FIG. 2 schematically shows such a system 19 that is formed through the first utility meter 14A, the first, second, third and fourth data reporting M2M devices 12A, 12B, 12C and 12 and a server 20 implemented via the head end 18. The first utility meter 14A here reports data of its own to the server 20 as well as acts as a gateway for the various devices 12A-12D in their communication with the server 20.

Here the first concentrator 16A has been omitted as it may not be involved in the determining of communication to be used. As the second meter 14B and the second concentrator 16B are not part of the M2M system 19, they have also been omitted. Thereby it can also be seen that the first utility meter 14A may as an alternative be directly connected to the head end 18.

The first data reporting M2M device 12A is here exemplified by a video camera, the second data reporting M2M device 12B by a climate control panel, the third data reporting M2M device 12C by a refrigerator and the fourth data reporting M2M device 12D by a smartphone. As can be seen from FIGS. 1 and 2, the data reporting M2M devices 12A-12D are a variety of fixed/mobile devices that communicate over IP/non-IP protocols and using different communication media.

The M2M Server 20 is responsible for hosting an M2M control Application. This M2M control application (on the M2M Server) manages/controls the behavior of an M2M Client hosted on the M2M Device 14A. Thereby the M2M device 14A is a client entity that communicates with the sever 20, which in turn is a server entity.

Also the client entity 14A, which acts as an M2M Gateway as well as an M2M Client, can support multiple communication types e.g. TCP/IP, PLC i.e. IP/Non-IP based communication. The client entity 14A thereby controls the flow of data from one or more applications to the server entity. It thus controls the flow of data from the applications in the data reporting M2M devices 12A-12D as well as the flow of data from any own applications.

As can be seen in FIG. 1 there are thus various communication types that can be used, i.e. packet based over the Internet as well as PLC via an electric power system. The server entity 20 may thus manage the various devices in the M2M system 19, such as the data reporting M2M devices 12A-12D as well as the utility meter 14A. An end user 21 may also view/control the M2M system 19 using an application interface that is provided by the server entity 20.

Furthermore there are at least two different available communication types between the server entity 20 and client entity 14A. It is thereby possible to select communication type and also communication medium.

It can thus be seen in FIG. 2 that a smart meter, the utility meter 14A, is acting as a M2M Gateway behind which the complete M2M Area Network is hosted.

It should here be realized that client entity does not have to act as a gateway for the data reporting M2M devices. It may in fact only report data it itself has to send. As an alternative it may not have any own data to report but only be a concentrator for forwarding data from connected data reporting M2M devices.

As was described above, aspects of the invention is concerned with improving on the way communication types are selected in an LWM2M system. This is according to some variations of the invention done through the use of a communication policy control device.

With demand response systems and dynamic communication needs from the M2M network, the introduction of a communication policy control device in the COSEM/DLMS based system is thus proposed.

A communication policy control device may be provided as either of the client entity and the server entity. In some cases both the server entity and the client entity may be a communication policy control device. In the following, the utility meter 14A that hosts an LWM2M client is considered to be a communication policy control device.

Figure 3:
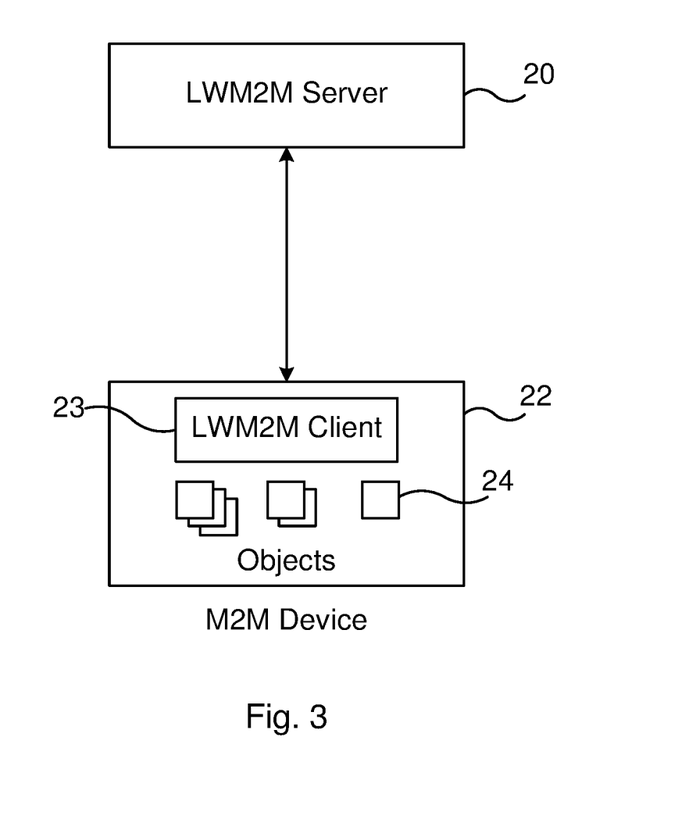

FIG. 3 schematically shows one way in which the communication policy control device 22 may be implemented. FIG. 3 schematically shows the communication according to COSEM that takes place between the LWM2M server 20 and the M2M device or client entity acting as communication policy control device 22. The figure more particularly shows that there is a LWM2M client 23 in the communication policy control device 22, which LWM2M client communicates with an LWM2M server 20. In known parts of this communication there are Bootstrap, Client Registration, Device Management & service enablement and information reporting Interfaces. There is also a stack with efficient payload, CoAp protocol, DTLS security and UDP or SMS Bearer stack. This is as such nothing new and known in the art.

However, COSEM defines a number of (software) objects for handling these interfaces and stacks. According to variations of the invention, it is proposed that a COSEM object 24 residing in the client entity will act as communication policy control unit that holds or accesses one or more policies setting out how the various communication types, communication profiles and communication media are to be used on the basis of which appropriate communication profile is setup and onwards communication happens.

A policy, which may also be implemented as a COSEM object, may furthermore be dynamically updated from the server entity to control the behaviour of communication profiles.

Figure 4:
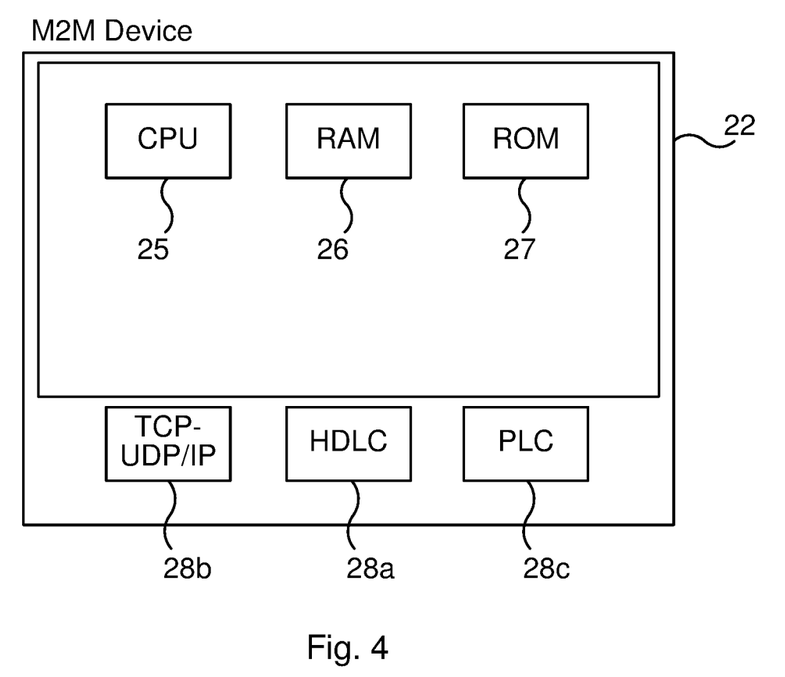
FIG. 4 shows a block schematic of one realization of the M2M device that acts as a communication policy control device.

FIG. 4 schematically shows another way in which a communication policy control device 22 may be implemented through the gateway functionality of the utility meter 14. The communication policy control device 22 may comprise a processor, such as central processing unit (CPU) 25 as well as a Random Access Memory (RAM) 26 and a Read Only Memory (ROM) 27. One or both of the RAM 26 or ROM 27 may comprise computer program code which makes the processor implement a communication policy control unit of the communication policy control device. One or both of the memories may also comprise computer program code implementing a communication unit acting as a M2M Client as well as one or more applications, such as a utility metering application. The RAM 36 may also be used to implement one or more input and output buffers. If an application that is to report data to the server entity is to be provided in the communication policy control device 22, software implementing the application may also be provided in one or both of the memories. In this case the communication policy control device 22 may also comprise one or more sensors or meters, such as an electricity meter (not shown).

The RAM memory 25 may also implement a status memory, where operational parameters of the communication policy control device 22 itself is stored. One or both of the memories may also implement a policy storage comprising one or more communication polices. The communication policy control device 22 also comprises, a first, second and third communication interface 28A, 28B and 28C, where there is one communication interface for each communication type that the device 22 supports. In the present example it supports the first, second and third communication types CT1, CT2 and CT3. In the present example there is thus a first communication type interface 28A for HDLC communication, a second communication type interface 28B for TCP-UDP/IP communication and a third communication type interface 28C for PLC communication. These interfaces are thus communication interfaces towards various communication media. The first interface 28A may thus be connected or connectable to a data reporting M2M devices via a point-to-point connection or a second generation mobile communication network, the second interface 28B may be connected to a data communication network such as a LAN, WAN or the Internet as well as to a third or fourth generation mobile communication network, while the third interface 28C may be connected to an electric power supply network ESN. The interfaces may be provided as dedicated circuitry such as radio circuitry and connected to optional antennas, where such circuitry may be implemented through the use of Digital Signal Processors (DSPs). In some cases one or more of the communication interfaces may also be provided as software that are active when being run by the processor 25.

Figure 5:
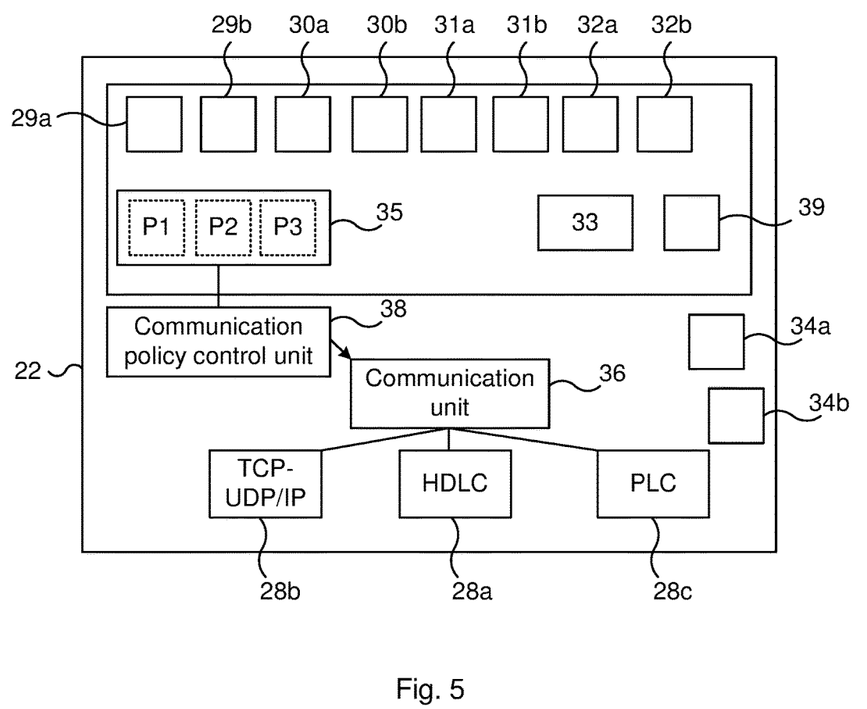
FIG. 5 shows a block schematic of another realization of the M2M device that acts as a communication policy control device.

FIG. 5 shows a block schematic of a second way of realizing the communication policy control device 22. In this case there are also the first, second and third interfaces 28A, 28B and 28C. However, these are connected to a communication unit 36 for handling communication between the client entity and the server entity. The communication unit 36 therefore comprises functionality for acting as an M2M client according to COSEM. There is also a communication policy control unit 38 or communication profile controller 38 connected to the communication unit 36, which communication policy control unit 38 also has access to a policy storage 35 comprising a number of communication policies P1, P2 and P3. There is also an application 33 set to perform an M2M activity, such as handling metering of the electric consumption being sensed by an electricity meter. There is also a status memory 39, where the status of operational parameters of the communication policy control device 22 itself is stored. There are furthermore a number of input and output buffers.

There is in this case a pair of input and output buffers for each data reporting M2M device that communicates through the communication policy control device 22 as well as a pair of input output buffers for communication with the server entity 20.

There is thus a first input buffer 29A and first output buffer 29B for receiving data from and sending data to the application of the first data reporting M2M device 12A, a second input buffer 30A and a second output buffer 30B for receiving data from and sending data to the application of the second data reporting M2M device 12B, a third input buffer 31A and third output buffer 31B for receiving data from and sending data to the application of third data reporting M2M device 12C, a fourth input buffer 32A and fourth output buffer 32B for receiving data from and sending data to the application of the fourth data reporting M2M device 12D and a fifth input buffer 34A and fifth output buffer 34B for communication with the server entity 20. The input buffers are filled with data from the applications of the data reporting M2M devices and the server entity via the interfaces 28A, 28B and 28C under the control of the communication unit 36 and the output buffers are filled with data to be sent to the applications of the data reporting M2M devices and server 20 also under the control of the communication unit 36. Here it may also be noted that also the application 33 within the communication policy control device 22 may have data that is placed in the fourth output buffer 34B and may receive data from the fourth input buffer 34A. Alternatively it is possible that also the application 33 has its own dedicated input and output buffers.

An M2M Device that supports various communication types like the one shown above, e.g. TCP/IP, HDLC, PLC etc. greatly benefits from the inclusion of the communication policy control unit 38, which can be used to allow dynamic control over the communication types and communication media. This can also be useful in load-sharing, active-standby kind of cases where there may exist a need to ensure that the M2M Device is intelligently handling traffic flow.

As mentioned above, the communication policy control unit 38 could be provisioned in the form of a Management Object on the M2M Device or could reside as business logic entity. Furthermore, if the communication policy control unit 38 has an interface towards the M2M Server 20, it would also be possible for the M2M server 20 to dynamically and remotely provide rules, conditions and modifiers into the communication policy control device 22.

An example of the suggestion could be building the Communication Profile Control unit as COSEM object into a Smart Meter. However, a more generic entity could also be present in M2M Devices.

Figure 6:
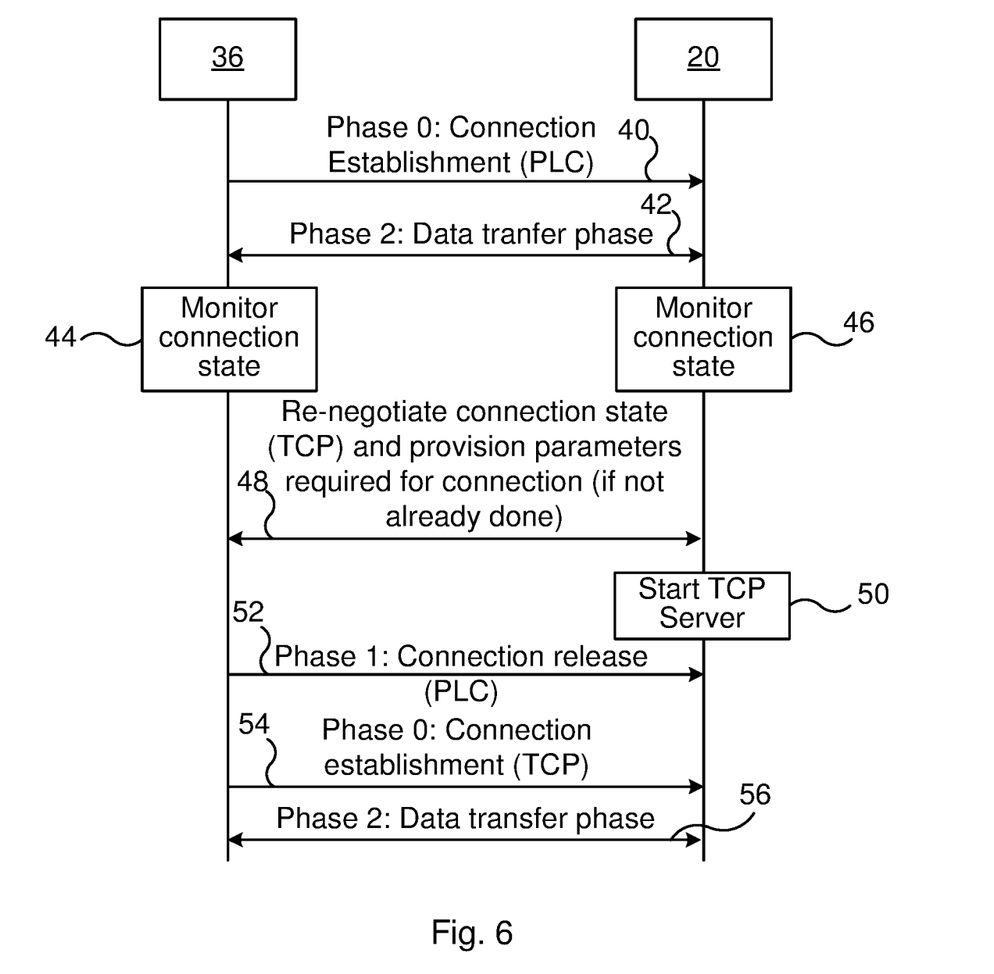
FIG. 6 shows a signalling chart between the client and server entities according to a first embodiment.
Figure 7:
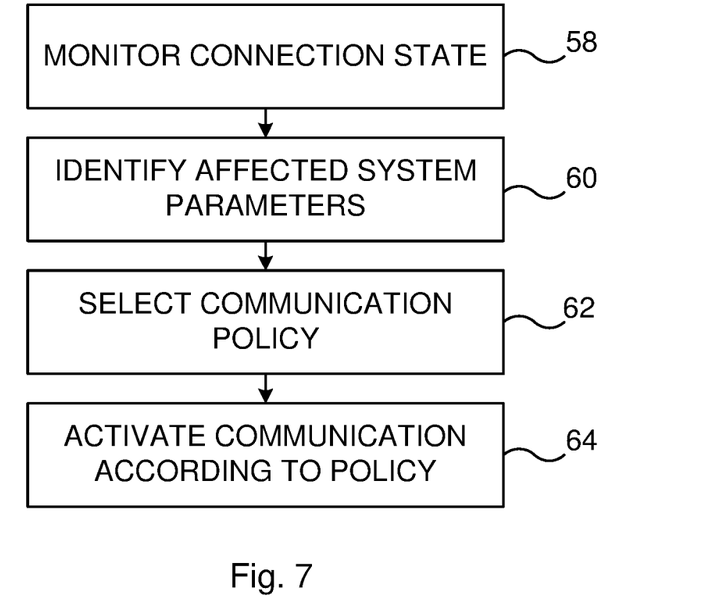
FIG. 7 shows a flow chart of a number of method steps in a method of determining type of communication to be used by a client entity reporting data to a server entity according to the first embodiment, which method steps are performed in the communication policy control device.

The functioning of a first embodiment of the invention will now be described with reference being made also to FIGS. 6 and 7, where FIG. 6 shows a signaling chart of signals exchanged between the server entity 20 and the communication unit 36 of the client entity, and FIG. 7 shows a flow chart of a number of method steps in a method of determining type of communication to be used by a client entity reporting data to a server entity according to the first embodiment and being performed in the client entity.

The communication unit 36 of the client entity may initially, in a phase 0, establish a connection 40 over a connection medium with the server entity 20. The connection establishment may for instance involve handshaking between the communication unit 36 and a corresponding unit in the server 20. This connection may as an example be a connection according to the third type CT3 using PLC over the connection medium that is the electric power supply system ESN, where also communication settings may be employed in order to implement a certain communication profile.

Thereafter data is transferred 42 in a phase 2 a data transfer phase, between the client entity and the server entity 20. The data being transferred may comprise data from one or more applications such as a video recording application, a refrigerator monitoring application, an electricity metering application or a climate system application. This data may with advantage be collected by the communication unit 36 from the first-fourth input buffers 29A, 30A, 31A and 32A as well as directly from the application 33 and placed in the fifth output buffer 34B for being transmitted via the currently used interface to the server entity 20. In the above described example, the third interface 28C would thus be used.

When this has been done the communication policy control unit 38 monitors 44 the connection state of the communication being performed according to the current communication type over the current communication medium, step 58, where the current communication type and communication medium in the above given example would be the PLC communication type and the communication medium the ESN network. Also the server entity may monitor 46 connection state.

The connection state may as an example be exemplified by data such as the communication speed, such as bit rate used, bit error rate and number of retransmissions.

Thereafter the communication policy control unit 38 identifies system parameters affected by the connection state, step 60. The system parameters, which are parameters in the M2M system 19, can then be communication parameters, application parameter or client entity parameters. The system parameters may thus include parameters associated with the actual communication over the currently used communication medium with the current communication type and current communication type settings, i.e. the combination of currently used communication medium and communication profile. The communication parameters may be such parameters as packet upload/download speed, packet loss or number of bytes transmitted. The client entity parameters, which are parameters associated with the client entity itself, may comprise parameters setting out a current state of the client entity, like the energy level of an energy source like a battery. The application related parameters may comprise parameter defining which application has data to be transferred. The application related parameters may also be related to the rate at which an application generates data intended for the server entity. This can be determined through interrogating the application in question, such as interrogating the application 33 or through investigating the rate with which an application fills an input buffer. The communication profile control unit 38 may thus obtain the communication parameters from the communication unit 36, may obtain the client entity parameters through reading in the status memory 39 and may obtain the application parameters through looking at the first-fourth input and/or output buffers 29A-31A, 29B-31B and/or through interrogating the application 33.

After having determined system parameters that are affected by the connection state, the communication policy control unit 38 continues and selects a communication policy P1, P2 or P3 based on the affected system parameters, step 62, where the communication policy sets out rules for the use of one of more communication types. The selection of a communication policy may also be based on the character of an application for which at least some application parameters have been found to be affected. The character may be seen as the demands that the application has on the M2M communication system as well as the demands it has on communication types and communication media. Some applications may for instance have a speed requirement, which in turn may require certain communication types or settings to be used, while others may have reliability requirement in that data should have to be reliably transferred without distortion. Other applications may have no time or reliability criticality.

The selected communication policy may thus set out rules about which communication type and communication medium is to be used and also how it is to be used. In the case of the second communication type CT2 it may for instance comprise rules for when UDP is to be used and when TCP is to be used or when a change is to be made from one communication type to another.

The communication policy control unit 38 then instructs the communication unit 36 to activate communication over a communication medium according to a communication type specified by the communication policy, step 64, if this is not already in place.

In case there is to be a change, the communication unit 36 then renegotiates 48 the connection state with the server entity 20 via the corresponding communication interface, and provides the parameters that are necessary for this connection. In the case of a change from PLC to IP, this may involve renegotiating a TCP connection or UDP connection via the second interface 28B, in case this is applicable, and provide the required IP addresses and port numbers.

This may be followed by the release 52 of the original connection PLC, establishment 54 of the new connection TCP and data transfer 56 over the new connection.

Through this first embodiment it is possible to implement a dynamic selection of communication type and communication medium based on communication state and system parameter affected by the communication state. Thereby it is possible to more efficiently use the communication types and communication media at hand.

Figure 8:
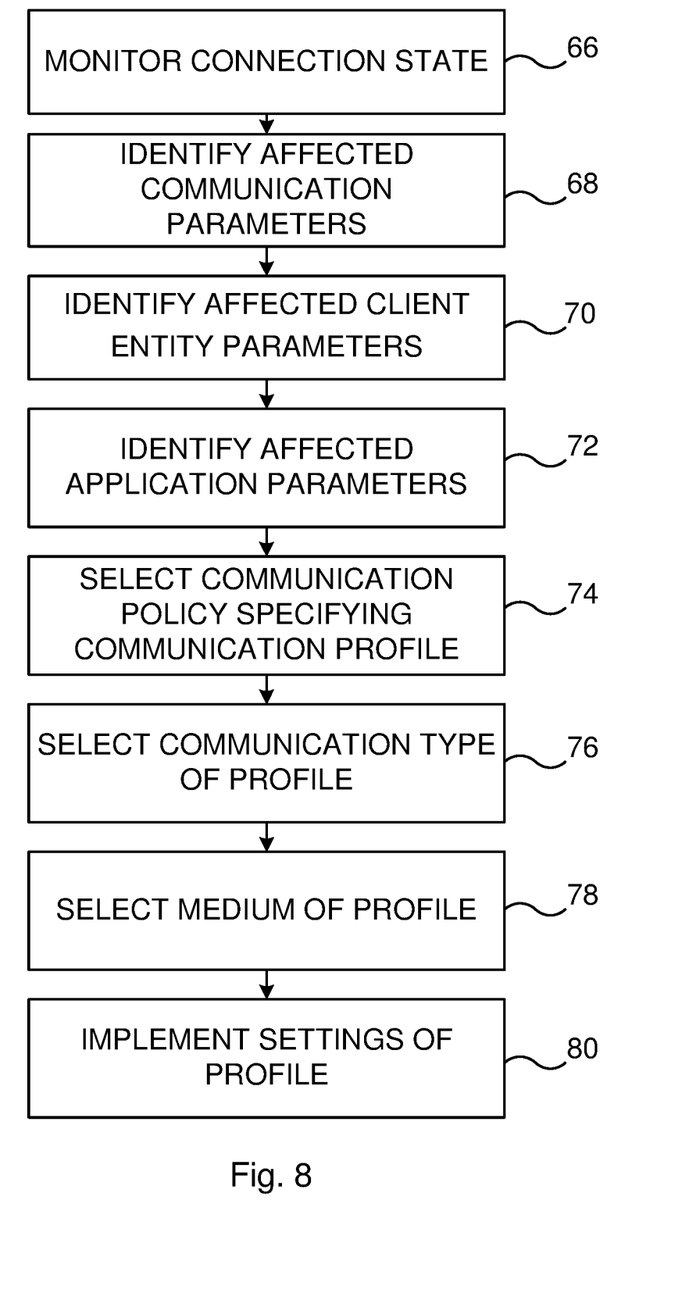
FIG. 8 shows a flow chart of a number of method steps in a method of determining type of communication to be used by a client entity reporting data to a server entity according to a second embodiment, and, FIG. 9 shows a computer program product comprising a data carrier with computer program code for implementing functionality of the communication policy control device.

A second embodiment will now be described with reference being made to FIG. 8, which also shows a flow chart of a number of method steps in a method of determining type of communication to be used by the client entity, which method is carried out by the communication policy control unit 38 of the communication policy control device 22.

As in the first embodiment it is here assumed that a communication profile over a communication medium is already in effect.

Thereafter, the communication policy control unit 38 monitors the connection state of the communication according to the current communication type over the current communication medium, step 66, where the current communication type and communication medium could either be PLC over the ESN network or TCP/IP or UDP/IP over the Internet. The communication state may also here comprise the communication speed, such as bit rate used and number of retransmissions or number of errors in the transmissions, which may be monitored through the assistance from the communication unit 36.

Thereafter the communication policy control unit 38 identifies which communication parameters are affected by the connection state, step 68, such as packet upload/download speed, packet loss or number of bytes transmitted and bit error rate. These parameters may also be obtained from the communication unit 36. The communication policy control unit 38 also identifies client entity parameters that are affected by the current connection state, step 70. This may involve investigating various status parameters in the status memory 39. This may involve looking at if the battery of the client entity has an energy level that is low, for instance through being below a certain energy level threshold. The communication policy control unit 38 furthermore identifies application parameters that are affected by the connection state, step 72. For this reason the communication policy control unit 38 may look at one or more of the input buffers 29A, 30A, 31A and 32A, associated with the data reporting M2M devices 12A, 12B, 12C and 12D. It may also or instead look at one or more of the output buffer 29B, 30B, 31B and 32B associated with the data reporting M2M devices. The investigation may involve an investigation about what application that has data to send. This may be done through investigating if the input buffers have any data. The investigation may also look at how full these input and/or output buffers are, i.e. how much data there is, the rate with which they are filled as well as the age of the data in the buffers. The communication policy control unit 38 may also directly make enquiries to the application 33 of if it has data to send or needs to receive and the age and speed of increase in the generation of such data. If there is no data in an input buffer, this may mean that the application parameter is not affected. Furthermore, also a low rate of increase in the filling of a buffer may indicate that an application parameter is not affected, while the existence of data and a high a high rate might be indicative of the application parameter being affected.

After having determined all system parameters that are affected by the connection state, the communication policy control unit 38 continues and selects a communication policy in the policy memory 35 based on the affected system parameters, step 74. The selection may here consider the various parameters as well as the character of the applications for which system parameters have been found to be affected. The character may be seen as the demands the application has on the M2M communication system as well as on the communication profiles. The communication policy control unit 38 may thus consider the requirement on the communication media and communication types that the various applications may have in the selection of communication policy. The selection of policy may more particularly involve the selection of at least one communication profile. A selected communication profile may thus specify at least one communication policy to be used.

The communication policy control unit 38 may as an example select the first communication policy P1, which specifies the use of a communication profile, where a communication profile is the totality of communication medium, communication type, and communication type settings. The communication policy control unit 38 then implements the communication profile specified by the communication policy if it is not already in use.

The implementation of the communication profile may comprise selecting a communication type of the profile, step 76, for instance TCP/IP or UDP/IP. It may also involve selecting the medium of the profile, step 78. In some cases there is only one medium. In the case of PLC, there would only be one medium, the ESN network, in which case the selection of communication type would lead to this medium being selected by default. In the case of TCP/IP or UDP/IP there may exist a number of alternative media between the client entity and the server entity. There may for instance exist an Internet connection via various LAN and WLAN networks as well as a Mobile Communication Network Connection via UMTS or LTE. The choice of medium could thus involve a selection between various media. Thereafter the communication policy control unit 38 implements the settings of the profile, step 80, which may involve selecting IP address and port number to be used.

The communication policy control unit 38 thereafter instructs the communication unit 36 to activate communication over a communication medium according to the communication type.

In this way there is provided a mechanism to dynamically provision a policy on the basis of which decisions are taken and communication profile is activated. Thereby it is possible to send certain events on mobile network technology like events and data collection on PLC. In the case of use of mobile network technology, it is also possible to accumulate data if signal strength is lower than a certain limit and send them when signal strength improves. It is also possible to dynamically switch the communication type if the signal strength is not there or maybe an industrial meter. So that important profile meters continue working without impact on the services.

In the example above, the use of three different communication types were given. It should however be realized that more communication types could be present as well as added to the ones currently in use. The communication policy control unit may therefore be both scalable and flexible. Demand-response systems will be impacted severely if the communication is not happening with the end smart meter impacting the complete smart grid demand response algorithm. So, support for multiple communication media along with a controller to ensure always on connectivity will keep the demand response system intact.

Mobile operator and Utility companies can handshake at what communication media shall be used at what location and time to optimize the network resources and efficiently use them. Also, the support for dynamically switching the medium based on policy will help define network usage policies taking into consideration various variables.

As mentioned earlier, the communication policies may not be fixed. One or more of the communication policies may be updated in real-time. The server may as an example provide a policy to a communication policy control unit in the client entity stating that all traffic should be sent using TCP. However, after some time it may notice that the IP network is heavily congested and it may then change the policy on the utility meter to let the flow come using PLC. If the server entity provides the communication policy control device, it may then directly make the policy change. However, when the communication policy control device is provided by the client entity, then the update may be performed based on an instruction from the server entity 20.

Figure 9:
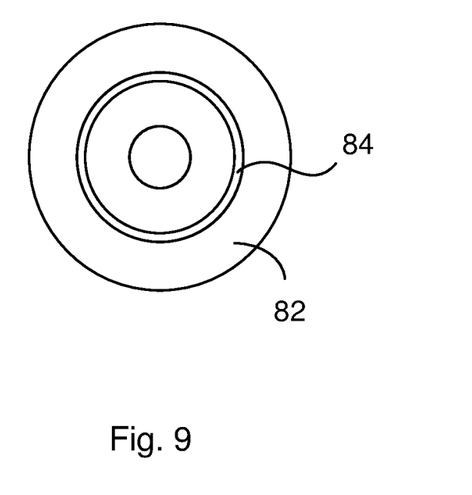

The computer program code of the communication policy control unit and optionally also that of the communication unit and the application may be in the form of computer program product for instance in the form of a data carrier, such as a CD ROM disc or a memory stick. In this case the data carrier carries a computer program with the computer program code, which will implement the functionality of the communication policy control unit and optionally also of the communication unit and application. One such data carrier 82 with computer program code 84 is schematically shown in FIG. 9.

The communication policy control device and particularly the communication policy control unit of the communication policy control device may also be considered to comprise: means for monitoring the connection state of communication according to a current communication type over a current communication medium,
means for identifying system parameters affected by the connection state,
means for selecting a communication policy based on the affected system parameters, where the communication policy sets out rules for the use of one or more communication types, and
means for activating communication over a communication medium according to a communication type specified by the selected communication policy, if not already in place.

The means for selecting a communication policy may be considered to comprise means for selecting policy also based on the character of an application for which at least some application parameters have been found to be affected.

The means for activating communication over a communication medium according to a communication type may be considered to comprise means for implementing settings for communication over the selected medium according to the communication type.

The means for identifying system parameters affected by the connection state may comprise means for identifying applications having data to send.

The communication policy control device and communication policy control unit of the communication policy control device may also be considered to comprise means for updating one or more of the communication policies in real-time.

In case the communication policy control device is implemented using the client entity, the means for updating one or more of the communication policies may finally comprise means for performing the update based on an instruction from the server entity.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the invention is only to be limited by the following claims.

The invention claimed is:

1. A communication policy control device for determining type of communication to be used by a client entity reporting data to a server entity in a machine-to-machine communication system, the client entity and server entity having at least two different available communication types between each other, the communication policy control device comprising:
processing circuitry;
memory containing instructions executable by the processing circuitry whereby the communication policy control device is operative to:
monitor a connection state of communication according to a current communication type over a current communication medium;
identify system parameters affected by the connection state;
select a communication policy based on the affected system parameters, the communication policy setting out rules for the use of one or more communication types;
activate communication over a communication medium according to a communication type specified by the selected communication policy, if not already in place; and
wherein each communication type defines a type of data exchange over a corresponding type of network.

2. The communication policy control device of claim 1:
wherein the client entity controls transmission of data from one or more applications to the server entity; and
wherein the system parameters comprise client entity parameters, application parameters, and communication parameters of the currently used communication medium and communication type.

3. The communication policy control device of claim 1, wherein the instructions are such that the communication policy control device is operative to select the communication policy also based on a character of an application for which at least some application parameters have been found to be affected.

4. The communication policy control device of claim 1, wherein the instructions are such that the communication policy control device is operative to implement settings for communication over the communication medium according to the communication type when activating communication over the communication medium according to the communication type.

5. The communication policy control device of claim 1, wherein the instructions are such that the communication policy control device is operative to identify applications having data to send when identifying system parameters affected by the connection state.

6. The communication policy control device of claim 1, wherein the instructions are such that the communication policy control device is operative to update one or more of the communication policies in real-time.

7. The communication policy control device of claim 6, wherein the instructions are such that the communication policy control device is operative to perform the update based on an instruction from the server entity.

8. The communication policy control device of claim 1, wherein the communication policy control device is implemented in the client entity.

9. The communication policy control device of claim 1, wherein the communication policy control device is implemented in the server entity.

10. A method of determining type of communication to be used by a client entity reporting data to a server entity in a machine-to-machine communication system, the client entity and server entity having at least two different available communication types between each other, the method comprising a communication policy control device:
monitoring a connection state of communication according to a current communication type over a current communication medium;
identifying system parameters affected by the connection state;

selecting a communication policy based on the affected system parameters, the communication policy setting out rules for the use of one or more communication types;

activating communication over a communication medium according to a communication type specified by the selected communication policy, if not already in place; and wherein each communication type defines a type of data exchange over a corresponding type of network.

11. The method of claim 10:

wherein the client entity controls transmission of data from one or more applications to the server entity; and wherein the system parameters comprise client entity parameters, application parameters, and communication parameters of the currently used communication medium and communication type.

12. The method of claim 10, wherein the selecting of a communication policy is also based on the character of an application for which at least some application parameters have been found to be affected.

13. The method of claim 10, wherein the activating comprises implementing settings for communication over the communication medium according to the communication type.

14. The method of claim 10, wherein the identifying comprises identifying applications having data to send.

15. The method of claim 10, further comprising the communication policy control device updating one or more of the communication policies in real-time.

16. The method of claim 15, wherein the updating is performed based on an instruction from the server entity.

17. A non-transitory computer readable recording medium storing a computer program product for determining type of communication to be used by a client entity reporting data to a server entity in a machine-to-machine communication system, the computer program product comprising software instructions which, when run on processing circuitry of a communication policy control device, causes the communication policy control device to:

monitor a connection state of communication according to a current communication type over a current communication medium;

identify system parameters affected by the connection state;

select a communication policy based on the affected system parameters, the communication policy setting out rules for the use of one or more communication types;

activate communication over a communication medium according to a communication type specified by the selected communication policy, if not already in place; and wherein each communication type defines a type of data exchange over a corresponding type of network.

* * * * *